United States Patent [19]

Moriyama et al.

[11] 3,960,750
[45] June 1, 1976

[54] ELECTRO-OPTICAL DISPLAY

[75] Inventors: Akio Moriyama, Katano; Masakazu Fukai, Nishinomiya; Komei Asai, Hirakata, all of Japan

[73] Assignee: Matsushita Electric Industrial Co., Ltd., Osaka, Japan

[22] Filed: Apr. 15, 1974

[21] Appl. No.: 460,876

[30] Foreign Application Priority Data
Apr. 16, 1973    Japan................................ 48-43418

[52] U.S. Cl................................ 252/299; 252/408; 350/150; 350/160 LC
[51] Int. Cl.²...................... G02F 1/16; C09K 3/34; G02F 1/13
[58] Field of Search..................... 252/408 LC, 299; 350/160 LC, 150

[56] References Cited
UNITED STATES PATENTS

| | | |
|---|---|---|
| 3,597,044 | 8/1971 | Castellano.................... 252/408 LC |
| 3,703,329 | 11/1972 | Castellano.......................... 252/299 |
| 3,781,088 | 12/1973 | Tsukamoto et al........... 252/408 LC |
| 3,815,972 | 6/1974 | Hsieh............................ 252/408 LC |
| 3,864,022 | 2/1975 | Moriyama et al................... 252/299 |
| 3,900,248 | 8/1975 | Nagasaki....................... 350/160 LC |

*Primary Examiner*—Benjamin R. Padgett
*Assistant Examiner*—T. S. Gron
*Attorney, Agent, or Firm*—Stevens, Davis, Miller & Mosher

[57] ABSTRACT

A nematic liquid crystal with positive dielectric anisotropy and a nematic liquid crystal with negative dielectric anisotropy are mixed such that the mixture is given a positive dielectric anisotropy and whenever any kind of pleochroic dye is dissolved therein, can effectively utilize its absorption anisotropy for display performances. A clear color-to-color contrast display is provided by employing the mixed liquid crystal added with pluralkinds of dyes of which at least one is a pleochroic dye and at least two are different in hue and in preformance characteristics of display device.

6 Claims, 6 Drawing Figures

ELECTRO-OPTICAL DISPLAY

This invention relates to an electro-optical display employing a nematic liquid crystal including a dye, and more particularly to an electro-optical display employing a particular nematic liquid crystal composition for effectively utilizing the absorption anisotropy of a dye or dyes used.

It is known that a thin layer of a nematic liquid crystal composition with positive or negative dielectric anisotropy added with a pleochroic dye can change color with effective electronic control and thus provides an electro-optical display.

Such a display utilizes the change in the absorption characteristics caused by the rotation of the dye molecules in cooperation with the rotation of the liquid crystal molecules in an electric field. A valuable display, however, is first provided when the molecular axis of the liquid crystal and the absorption axis of the dye molecules are directed in a given direction in a larger region in a cell containing them in the absence of an electric field.

Therefore, as the first step, an homeotropic, homogeneous or twisted structure of the thin layer will be produced.

When the liquid crystal molecules are randomly orientated, effective display performances by the dye molecules may be impossible because of generating memory phenomena of liquid crystal molecules or because of a decrease in color contrast under the application of an electric field.

This invention utilizes a nematic liquid crystal composition having positive dielectric anisotropy added with dyes.

Examples of liquid crystal compositions consisting of only nematic liquid crystals with positive dielectric anisotropy added with a pleochroic dye have already been proposed.

In such compositions, however, the absorption anisotropy of the dye may not be sufficiently utilized.

This invention is intended to eliminate such drawbacks and to utilize the absorption anisotropy of dye molecules effectively.

An object of this invention is to provide an electro-optical display utilizing a liquid crystal composition comprising a liquid crystal mixture of a nematic liquid crystal with positive dielectric anisotropy and a nematic liquid crystal with negative dielectric anisotropy, and at least one pleochroic dye mixed in the liquid crystal mixture for eliminating the drawback of a liquid crystal composition consisting of only nematic liquid crystals with positive dielectric anisotropy that it cannot effectively utilize dyes mixed therein.

Another object of this invention is to provide an effective electro-optical display using a liquid crystal composition containing plural kinds of dyes of which at least one is a pleochroic dye and at least two are different in hue and in display performance characteristics when the composition is interposed in a display cell, and capable of color switching through color-to-color contrast by a field application.

According to one aspect of this invention, there is provided a nematic liquid crystal composition for electro-optical display purposes comprising a mixed liquid crystal consisting essentially of a nematic liquid crystal with positive dielectric anisotropy and a nematic liquid crystal with negative dielectric anisotropy, and at least one kind of dye added to said mixed liquid crystal.

According to the present electro-optical display element, the conventional drawback that the absorption anisotropy of the dye cannot be fully utilized can be eliminated and display through color-to-color contrast can be achieved by appropriately controlling plural kinds of dyes of different display performance characteristics. The present display can also be achieved by the use of a sheet of polarizer located adjacent a display cell or plural polarizers within which the display cell is sandwiched. According to such display elements, a nematic liquid crystal having positive dielectric anisotropy can be used, therefore improvements such as lowering the threshold voltage of the element, reducing the power consumption and increasing the switching speed can result. The present display element can be formed in transmission type, relection type and absorption type display.

Description will be further made on preferred embodiments of this invention in conjunction with the attached drawings.

Preceding the description of the preferred embodiments, results of the preliminary experiments will be discussed first.

In nematic liquid crystal mixtures (I) and (II) as expressed below having positive and negative dielectric anisotropy, respectively, either one of a red dye (A) and a blue dye (B) as expressed below was added by 1 weight percent, respectively.

(I): Equal weight mixture of

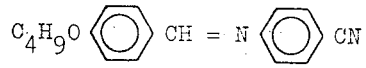

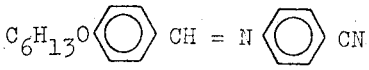

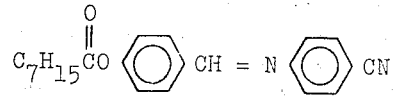

(II): Equal weight mixture of

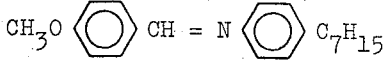

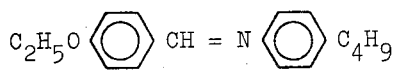

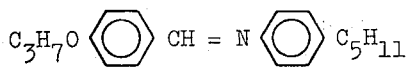

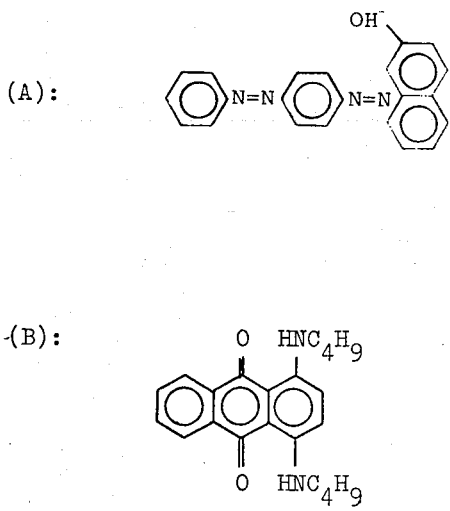

Each of these compositions was interposed between a pair of parallel glass plates in such a manner that the liquid crystal molecules of the mixture (I) exhibited a homogeneous arrangement and those of the mixture (II) a homeotropic arrangement. The color change of these devices by the application of an electric field was observed. The result is listed in the following Table 1.

Table 1

| Liquid crystal mixture | dye (A) | | dye (B) | |
|---|---|---|---|---|
| | Field OFF | Field ON | Field OFF | Field ON |
| (I) | colored | colorless | colored | colorless |
| (II) | colorless | colored | colored | colorless |

Consideration and discussion on the results of Table 1 will be made hereunder.

Figure 1A:
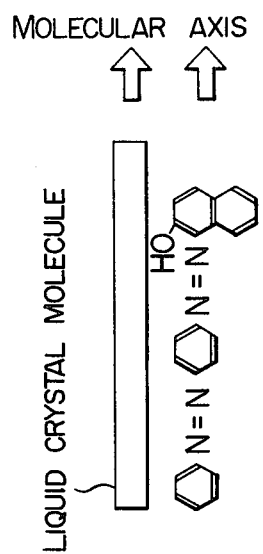
FIGS. 1A and 1B are schematic diagrams showing aligned states of dye molecules with liquid crystal molecules.
Figure 1B:
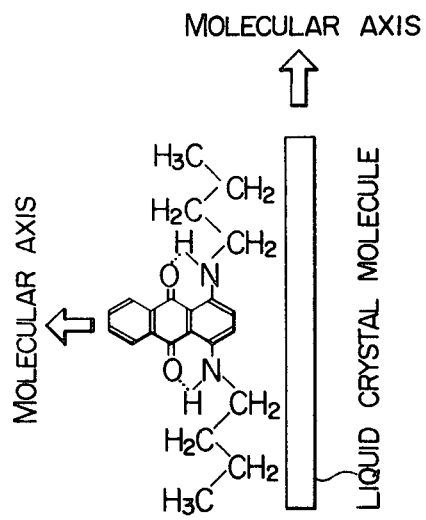

FIGS. 1A and 1B schematically show the arrangement of dye (A) and dye (B) molecules located adjacent the liquid crystal respectively, but since the interaction of molecular force between a liquid crystal and a dye added thereto is based on essentially Van der Waals force, the most stable state is obtained when the longitudinal molecular length of the dye is parallel to the molecular axis of the liquid crystal, as schematically illustrated in FIGS. 1A and 1B.

The longitudinal molecular length of dye (A) stretches parallel to its molecular axis, while that of dye (B) stretches along the alkyl chain added to 1,4-positions of the anthraquinone derivative and perpendicular to the molecular axis of the dye (B).

On the other hand, the value of absorption coefficient is larger along the transverse molecular axis than along the longitudinal molecular axis in both the dye (A) and the dye (B).

From the facts as mentioned above, it is understood that the dye (A) and the dye (B) disposed in the homeotropic nematic display cell with insertion of the mixture (II) exhibit such display performances on field switching as indicated in Table 1.

The results of Table 1 indicate that display performance of the dye (A) is normal but that of the dye (B) is abnormal when the dye (A) or the dye (B) is disposed in the homogeneous nematic display cell with insertion of the mixture (I).

It is estimated that the unreasonable result on the dye (B) in the mixture (I) stems from the properties of the nematic liquid crystals constituting the mixture (I).

Among the known nematic liquid crystals with positive dielectric anisotropy, the typical ones include p-n-hexylbenzylidene-p'-aminobenzonitrile, p-anisylidene-p'-aminobenzonitrile, p-capryloxybenzylidene-p'-aminobenzonitrile, p-cyanophenyl-p'-n-heptylbenzoate, p-cyanobenzylidene-p'-n-butoxyaniline, p-cyanobenzylidene-p'-aminophenylvalerate, etc. Most of these substances have a strongly polar nitrile group.

On the other hand, among the known nematic liquid crystals with negative dielectric anisotropy, the typical ones include p-anisylidene-p'-n-butylaniline, p-anisylidene-p'-aminophenylacetate, p-azoxyanisole, p-n-butylbenzoic acid p'-n-hexyloxyphenyl ester, butyl-p-(p'-ethoxyphenoxycarbonyl) phenylcarbonate, p(p'-ethoxyphenylazo)-phenylheptanoate, etc.

With respect to the performance characteristics, i.e. the color change from that in the absence of an electric field to that in the presence of an applied electric field, dyes can be classified into form groups as:

1. color change from a colored state to a colorless state;
2. color change from a colorless state to a colored state;
3. color change from a colored state of one hue to a colored state of another hue; and
4. no or nearly no color change.

Many dyes behave like said dye (A) and the number of dyes which behave in other ways is very few. For example, dyes which act as the dye (B) in the mixture (II) are very few. It is important to utilize such dyes effectively.

In the present invention, a nematic liquid crystal with positive dielectric anisotropy and a nematic liquid crystal with negative dielectric anisotropy are mixed such that the mixture is given a positive dielectric anisotropy and whenever any kind of pleochroic dye is dissolved therein, can effectively utilize its absorption anisotropy for display performances. Thereby, there is provided an electro-optical display which exhibits a performance characteristic from a colorless state to a colored state by applying an electric field to the composition including a predetermined dye, such as the dye (B).

Here, there is an optimum dye concentration for optimizing the contrast of the display. Usually, the maximum contrast is obtained in a liquid crystal composition including about 1 to 2 weight percent of a pleochroic dye. This maximum contrast is considered to correspond to the highest concentration of the dye molecules which can be aligned cooperatively. At concentrations below this optimum concentration, the absorption intensity for lights due to the existence of the dye becomes lower than that at the optimum concentration in the absence of an electric field. At concentrations above this optimum concentration, there exist more dye molecules than those which can be orientated by the cooperative alignment and thereby a considerable amount of absorption remains under the application of an electric field. Thus, at concentrations deviated from the optimum dye concentration, the contrast becomes inferior. Displays with color-to-color contrast can be achieved by mixing plural kinds of dyes which have different hue and different display performance characteristics in said mixed liquid crystal. In this case, the limitation for the dye concentration becomes looser than that in the former case. The effect of dye molecules below or above the optimum concentration can be used for coloring the color of the background or the figure (display).

More 2 plural kinds of dyes are added in the following combinations. Namely, among the dyes mixed in a mixed liquid crystal, at least one is a pleochroic dye which changes from a colorless state to a colored state or from a colored state of one hue to a colored state of another hue by the application of an electric field, whereas at least one kind of other dyes except the above has such a performance characteristic that it changes from a colored state to a colorless state, colored state of one hue to a colored state of another hue, or exhibits almost no change by the application of an electric field.

Table 2 shows basic combinations of two kinds of dyes M and N of different hue and the performance characteristic of the resultant display.

coated in an outer portion in an appropriate active region or regions. The surface of the both of the plate members is rubbed in a single direction in the appropriate active region. For forming the so-called homogeneous arrangement, a first and a second plate members are so disposed that the rubbed directions of the first and the second member in the active region are substantially parallel. For forming a twisted arrangement, the rubbed direction of the first and the second plate members are disposed with an angle.

Further details of this invention will be described with reference to the following embodiments.

EMBODIMENT 1

Mixed liquid crystal of said nematic liquid crystal mixture (I) with positive dielectric anisotropy and a nematic liquid crystal compound (III) with negative dielectric anisotropy;

(I) equal weight mixture of

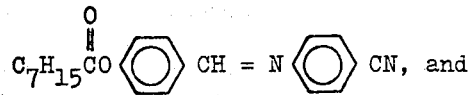

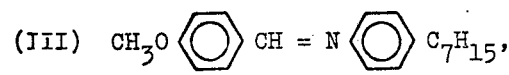

Table 2

| Dye M | | Dye N | | color change of the device | |
|---|---|---|---|---|---|
| Electric field OFF (hue of background) | Electric field ON (hue of figure) | Electric field OFF (hue of background) | Electric field ON (hue of figure) | Electric field ON (hue of background) | Electric field ON (hue of figure) |
| Colorless (A) | Colored (A') | Colorless (B) | Colored (B) | A + B | A' + B' |
|  |  | Colored (C) | Colored with another hue (C') | A + C | A' + C' |
|  |  | Colored (D) | No change (D') | A + D | A' + D' |
| Colored ($C_1$) | Colored with another hue ($C'_1$) | Colored (B) | Colorless (B') | $C_1$ + B | $C'_1$ + B' |
|  |  | Colored ($C_2$) | Colored with another hue ($C'_2$) | $C_1$ + $C_2$ | $C'_1$ + $C'_2$ |
|  |  | Colored (D) | No change (D') | $C_1$ + D | $C'_1$ + D' |
| Colored (D) | No change (D') | Colored (B) | Colorless (B') | D + B | D' + B' |

In the table, letters A, B, C, D, A', B', C' and D' represent colors given to the device and the combinations of these letters A + B, A' + B', etc. represent colors given to the device by the combination of the dyes M and N.

Table 2 shows combinations of two kinds of dyes. When the kinds and the number of dyes are increased, the number of possible combinations increases remarkably. The electro-optical display described so far can be improved further. The electro-optical display according to this invention becomes valuable when the liquid crystal phase exhibits a homogeneous arrangement or a twisted arrangement. A preferable device in this respect can be formed by the following method.

Figure 2:
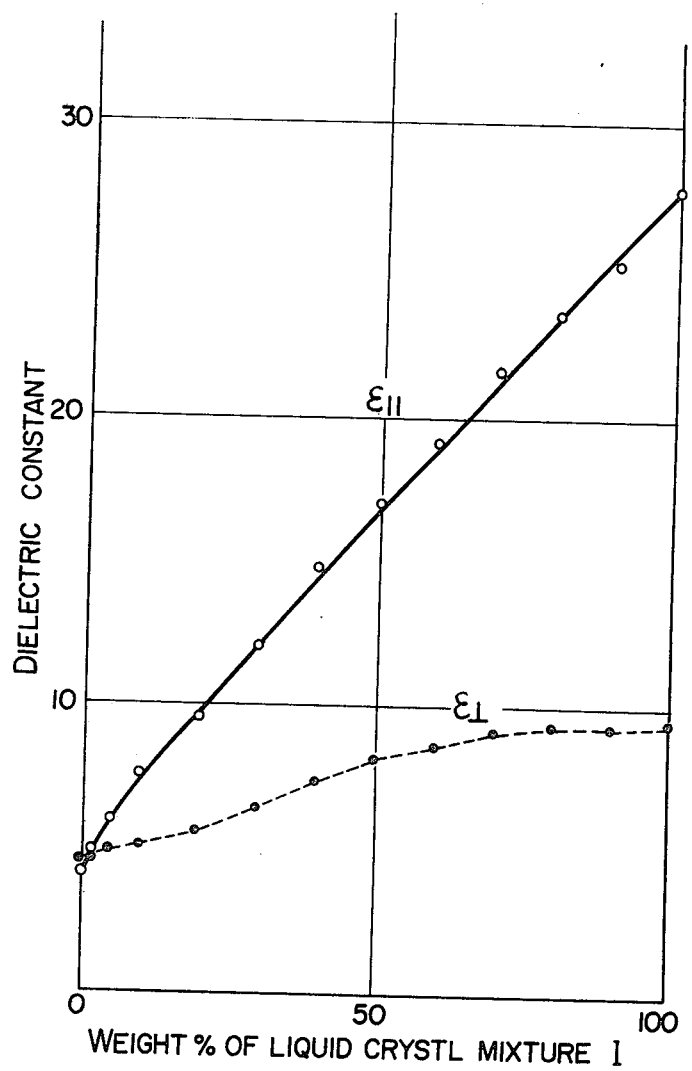
FIG. 2 is a diagram showing the relationship of the dielectric constant to the composition or proportion of a mixed nematic liquid crystal used in one embodiment of the electro-optical display element according to this invention.

Similar to the conventional ones, the electro-optical display according to this invention comprises a liquid crystal composition interposed between a pair of parallel plates and means for applying an electric field to this liquid crystal composition. Here, in a plate member, a displaying electrode film or films are disposed in an inner portion of a surface and a cerium oxide film is exhibit an effectively positive dielectric behavior when it contains the liquid crystal mixture (I) above about 1 weight percent as is seen from FIG. 2. In FIG. 2, letter $\epsilon_{\parallel}$ represents a component of the dielectric constant parallel to the longitudinal axis of the liquid crystal molecules and $\epsilon_\perp$ a component of the dielectric constant perpendicular to the longitudinal axis of the liquid crystal molecules.

In mixed liquid crystals at various compositions (proportions) of this system, 1 weight percent of either the red dye (A) or the blue dye (B) is mixed, respectively, (A) 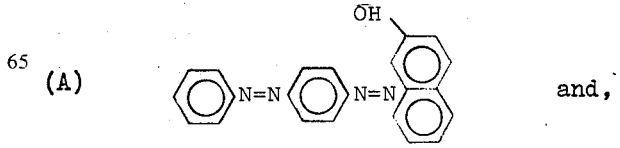 and, (B)

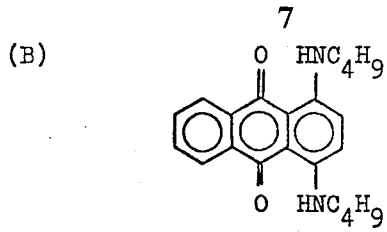

Such liquid crystal compositions are inserted in gaps of about 10 microns formed between a pair of parallel glass plates having surfaces provided with an indium oxide transparent electrode in an inner layer portion and a cerium oxide coating in an outer layer portion. In said pair of glass plates, each of the surfaces of the cerium oxide layer is rubbed in a single direction and the first and the second glass plates are so disposed that the rubbed directions are substantially parallel to each other. Means for applying an electric field is provided to such an assembly. Then the absorption characteristics of these elements are measured.

Elements containing the dye (A) exhibit an action into a colorless state by the application of an electric field in all the composition range except that with the content of the liquid crystal mixture (I) less than about 1 weight percent where the elements show an effectively negative dielectric behavior.

Elements containing the dye (B) exhibit an action into a colored state by the application of an electric field in the composition range from about 1 to about 65 weight percent of said liquid crystal mixture (I) and another action into a colorless state by the application of an electric field in the composition range above about 65 weight percent.

Figure 3A:
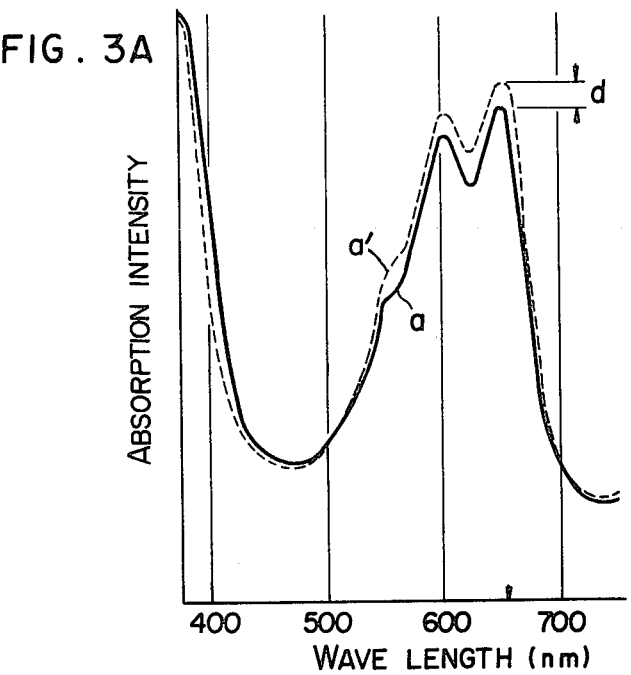
FIGS. 3A and 3B are diagrams showing the change in the absorption spectra in a mixed liquid crystal for two different compositions including the same dye due to a field application.
Figure 3B:
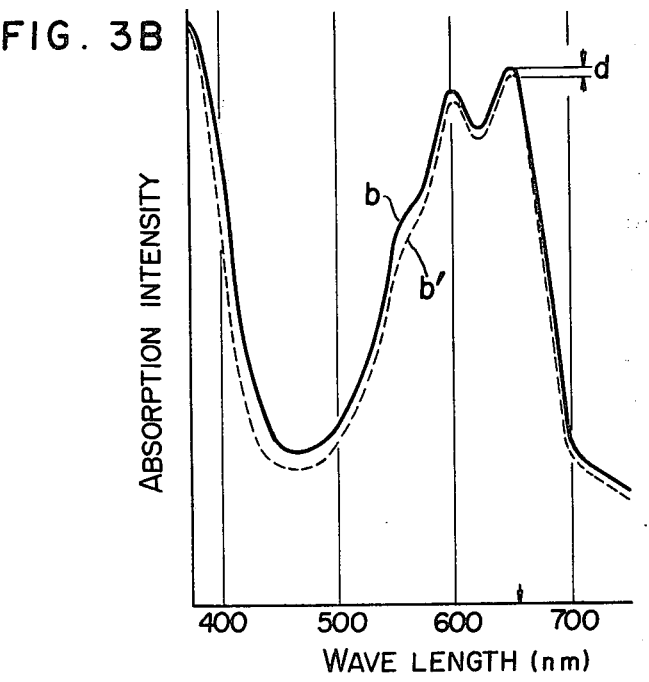
Figure 4:
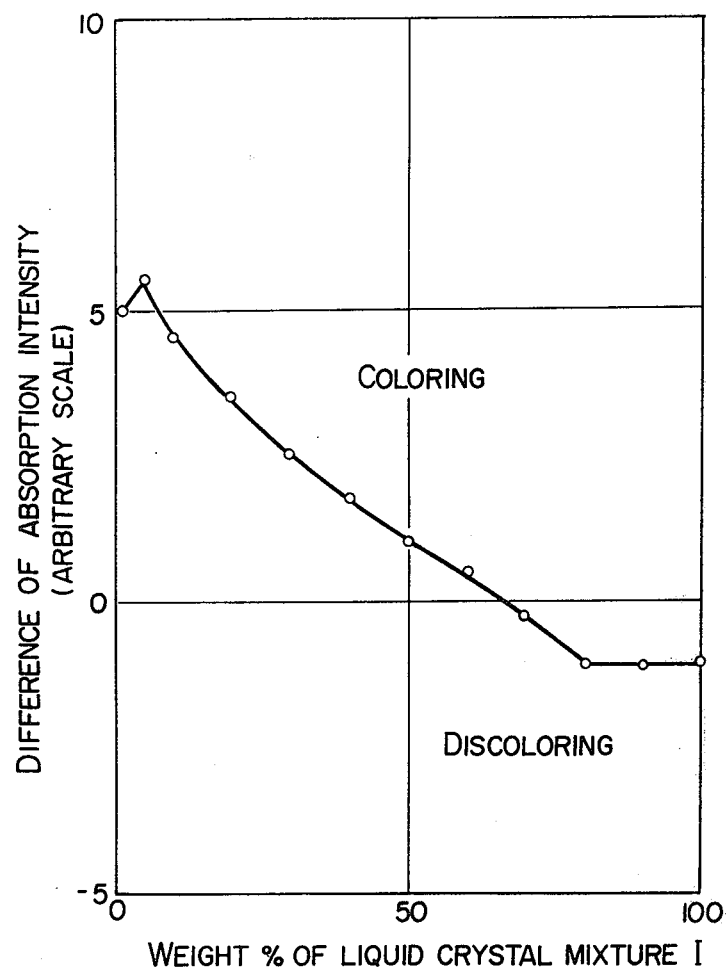
FIG. 4 is a diagram showing the change in the absorption intensity in a mixed liquid crystal for various compositions including the same dye due to a field application.

FIGS. 3A, 3B and 4 show experimental results for the latter case, i.e. liquid crystal composition including the dye (B), in which FIGS. 3A and 3B show absorption spectra in the devices using mixed liquid crystals at compositions of the liquid crystal mixture (I) to the compound (III) of 10 : 90 and 90 : 10 by weight respectively, and FIG. 4 shows the difference of the absorption intensity of the field "ON" state from the field "OFF" state at a wavelength of 655 nanometers with respect to the composition (where the absorption intensity in the absence of the field is referred to zero). In FIG. 3A, curves $a$ and $a'$ represent the absorption spectra of a device comprising a composition including the liquid crystal mixture (I) and the compound (III) at a ratio of 10 : 90 and the dye (B) when no electric field is applied and when an electric field is applied. In the figure, letter $d$ denotes the difference of absorption. In FIG. 3B, curves $b$ and $b'$ represent the absorption spectra of a device comprising a composition including the liquid crystal mixture (I) and the compound (III) at a ratio of 90 : 10 and the dye (B) in the absence and presence of an electric field, and letter $d$ denotes the difference of absorption, similar to FIG. 3A.

As is apparent from FIG. 4, giving a boundary at about 65 weight percent of the liquid crystal mixture (I), the difference of absorption intensity is positive (coloring by a field application) below this composition and negative (discoloring by a field application) above this composition.

EMBODIMENT 2

In a mixed liquid crystal at a composition of the liquid crystal mixture (I) to the compound (III) of 5 : 95, plural kinds of dyes at least two of which are different in hue and in display performance characteristics are mixed. Then, display cells similar to those of EMBODIMENT 1 are formed and their absorption characteristics measured. The composition of the dyes and the color change of the device by the application of an electric field are listed in Table 3.

Table 3

| | Composition (weight %) | | | Color change of the device | |
|---|---|---|---|---|---|
| | | | | Electric field OFF | Electric field ON |
| | Dye A | Dye B | | | |
| Example 1 | 1.5 | 1 | | red | blue |
| Example 2 | | 1 | 2 | yellow | blue |
| Example 3 | 1.5 | 1 | 2 | orange | blue |

As is seen from Table 3, the display devices according to this invention can display a figure in color-to-color contrast. Here, arbitrary coloring can be achieved by appropriately selecting the kinds of dyes.

What we claim is:

1. An electro-optical display containg a color switching liquid crystal composition comprising:

a nematic liquid crystal mixture with net positive dielectric anisotropy which is formed of a nematic liquid crystal material with positive dielectric anisotropy and a nematic liquid crystal material with negative dielectric anisotropy and exhibits in the absence of an electric field a homogeneous or twisted type arrangement and at least two kinds of dyes different in light absorption, at least one of said dyes being a pleochroic dye and at least two of said dyes having mutually different display performance characteristics with respect to the application of an electric field with a means for applying an electric field to said liquid crystal composition.

2. An electro-optical display according to claim 1, in which said liquid crystal mixture consists essentially of from about 1 to 65 weight percent of the nematic liquid crystal with positive dielectric anisotropy and from about 35 to 99 weight percent of the nematic liquid crystal with negative dielectric anisotropy.

3. An electro-optical display according to claim 1, in which at least two of said dyes are selected from the group consisting of
   a. dyes which change from a colorless state to a colored state,
   b. dyes which change from a colored state to a colorless state,
   c. dyes which change from a colored state to a colored state of another hue, and
   d. dyes which scarcely change the color upon application of an electric field above the threshold value across said nematic liquid crystal material.

4. An electro-optical display according to claim 1, in which one of said dyes is 1,4-dibutylaminoanthraquinone.

5. An electro-optical display according to claim 1, in which the nematic liquid crystal material with positive dielectric anisotropy in said nematic liquid crystal mixture includes

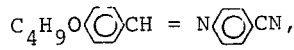

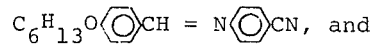

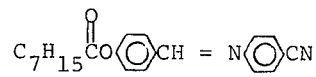

and said dyes include 1,4-disbutylaminoanthraquinone and at least one selected from the group consisting of

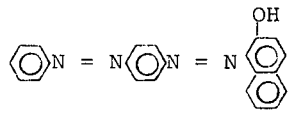

and

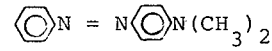

6. The electro-optical display according to claim 1, wherein in said liquid crystal composition said pleochroic dye is present in an amount from about 1 to 2 weight percent.

* * * * *